(12) United States Patent
Zehring et al.

(10) Patent No.: US 12,478,169 B2
(45) Date of Patent: Nov. 25, 2025

(54) MODULAR BIRDING ACCESSORY POLE SYSTEM

(71) Applicant: Holscher Products, Inc., Fowler, IN (US)

(72) Inventors: Steven B. Zehring, West Lafayette, IN (US); Joseph Holscher, Fowler, IN (US); John C. Holscher, Fowler, IN (US)

(73) Assignee: Holscher Products, Inc., Fowler, IN (US)

( * ) Notice: Subject to any disclaimer, the term of this patent is extended or adjusted under 35 U.S.C. 154(b) by 0 days.

(21) Appl. No.: 18/748,225

(22) Filed: Jun. 20, 2024

(65) Prior Publication Data

US 2024/0341456 A1   Oct. 17, 2024

Related U.S. Application Data

(63) Continuation-in-part of application No. 17/397,255, filed on Aug. 9, 2021, now Pat. No. 12,022,807.

(60) Provisional application No. 63/064,007, filed on Aug. 11, 2020.

(51) Int. Cl.
*A01K 31/12*    (2006.01)
*A45F 3/44*     (2006.01)

(52) U.S. Cl.
CPC ..................... *A45F 3/44* (2013.01)

(58) Field of Classification Search
CPC ......... A01K 31/12; A01K 31/14; A01K 39/01
See application file for complete search history.

(56) References Cited

U.S. PATENT DOCUMENTS

| | | | | |
|---|---|---|---|---|
| 2,753,743 | A * | 7/1956 | Middleton | .......... B25B 13/5091 |
| | | | | 81/52 |
| 5,199,361 | A | 4/1993 | Robinson | |
| 6,386,142 | B1 * | 5/2002 | Holscher | ................ A01K 31/12 |
| | | | | 119/51.01 |
| 7,246,783 | B2 * | 7/2007 | Harold | .................... A45B 25/00 |
| | | | | 248/156 |
| 10,119,652 | B2 * | 11/2018 | Cote | .................... F16M 11/041 |
| 10,557,590 | B1 | 2/2020 | Brassard | |
| 10,602,817 | B2 | 3/2020 | Price | |
| 11,624,200 | B2 * | 4/2023 | Aronow | .............. E04H 12/2223 |
| | | | | 52/157 |
| 2009/0065662 | A1 | 3/2009 | Taylor | |
| 2010/0175627 | A1 | 7/2010 | Carpenter | |
| 2014/0020310 | A1 | 1/2014 | Lee | |
| 2015/0368924 | A1 | 12/2015 | Izradel | |
| 2017/0251792 | A1 | 9/2017 | Brooks | |

(Continued)

*Primary Examiner* — Bradley Duckworth
(74) *Attorney, Agent, or Firm* — Maginot, Moore & Beck

(57) ABSTRACT

A pole system is provided for supporting birding accessories, such as bird feeders, perches or bird houses. The pole system includes a hollow outer tube and an elongated post extending therethrough. The post has an auger at one end and an opposite end configured to engage a tool for rotating the post. An extension tube can be provided to extend the height of the pole system and that can be used as a tool for driving the auger into the ground. A clamp is provided for engagement with the outer tube, in which the clamp includes a recess for removably slidably receiving a tongue of an accessory. A doubler is also provided that can be received within the clamp recess and which includes a pair of sleeves for receiving the tongue of other accessories.

11 Claims, 16 Drawing Sheets

(56) References Cited

U.S. PATENT DOCUMENTS

2021/0085063 A1\* 3/2021 Brooks ................ F41B 5/1453
2021/0324653 A1 10/2021 Narvaez-Newman \* cited by examiner

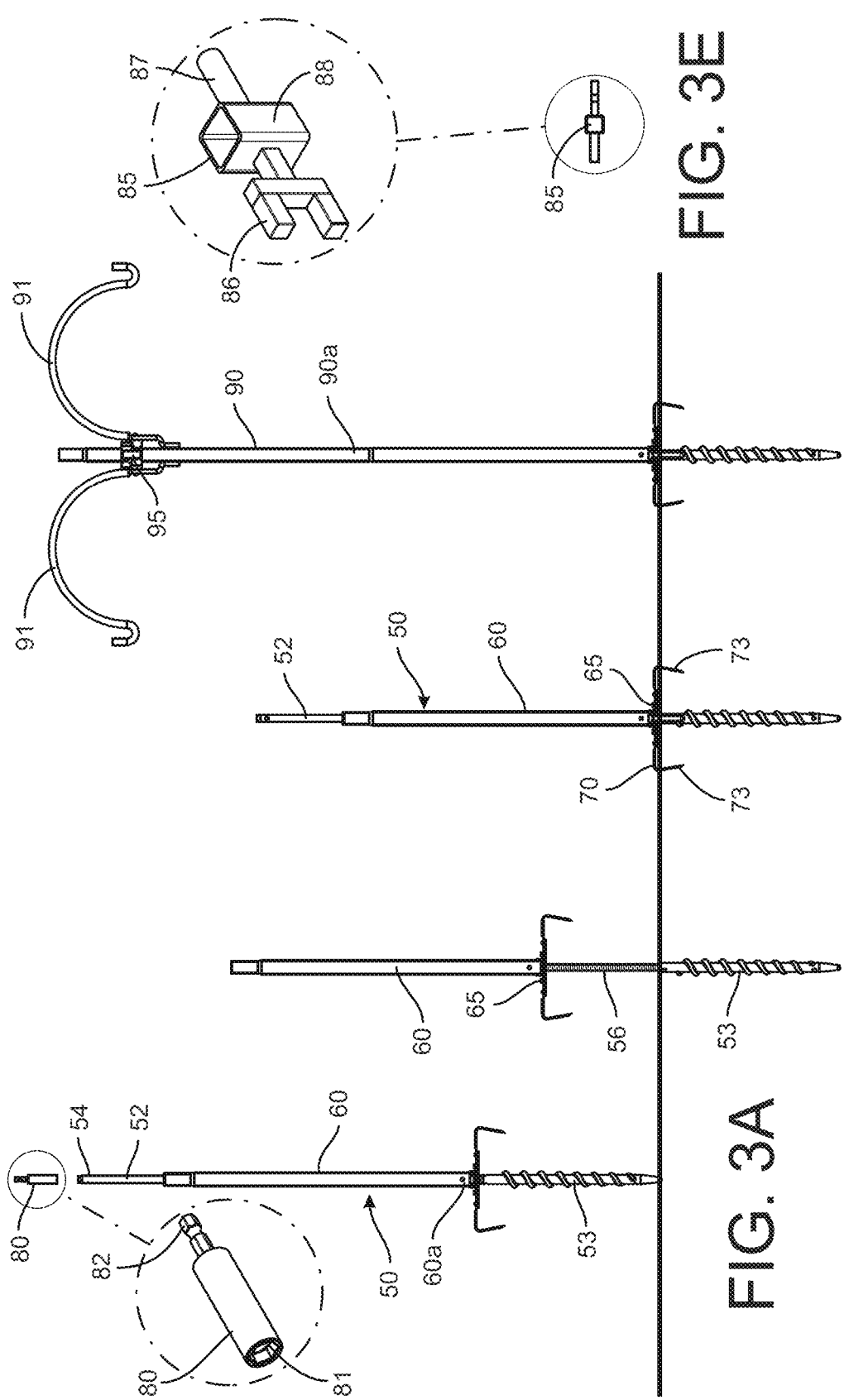

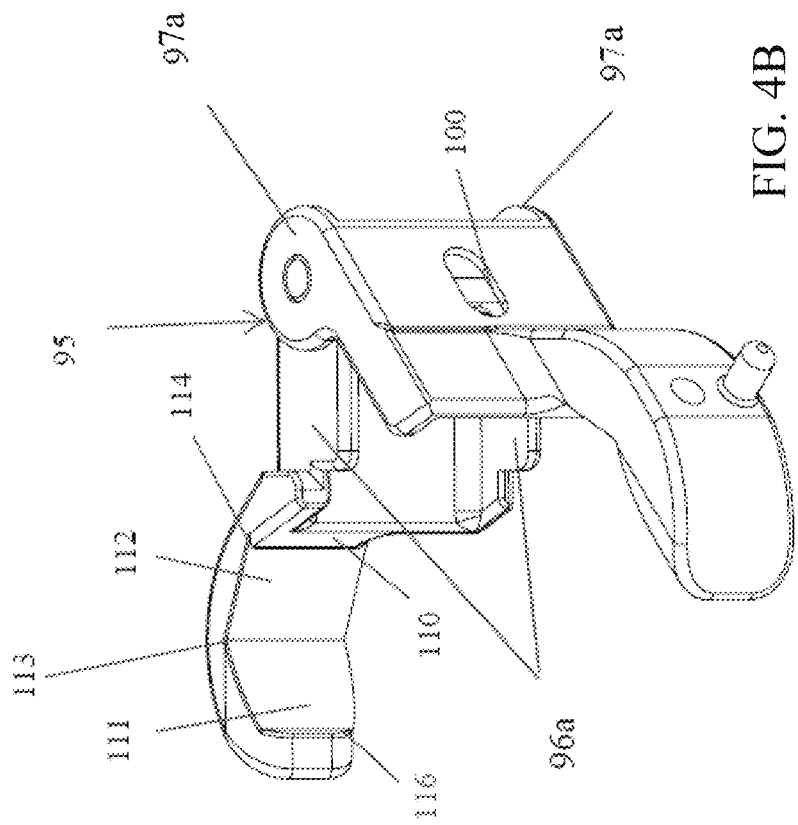
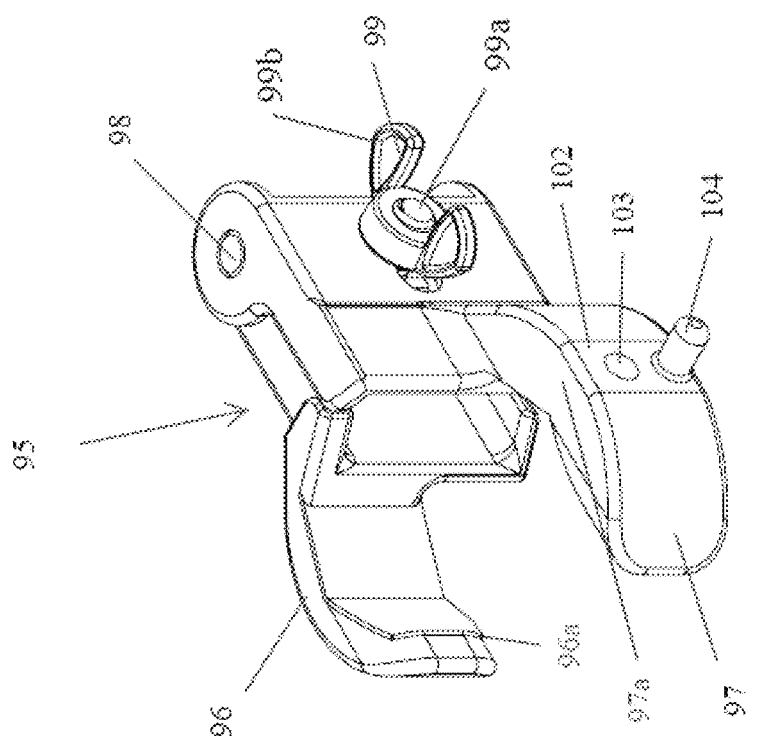
FIG. 4B
FIG. 4A

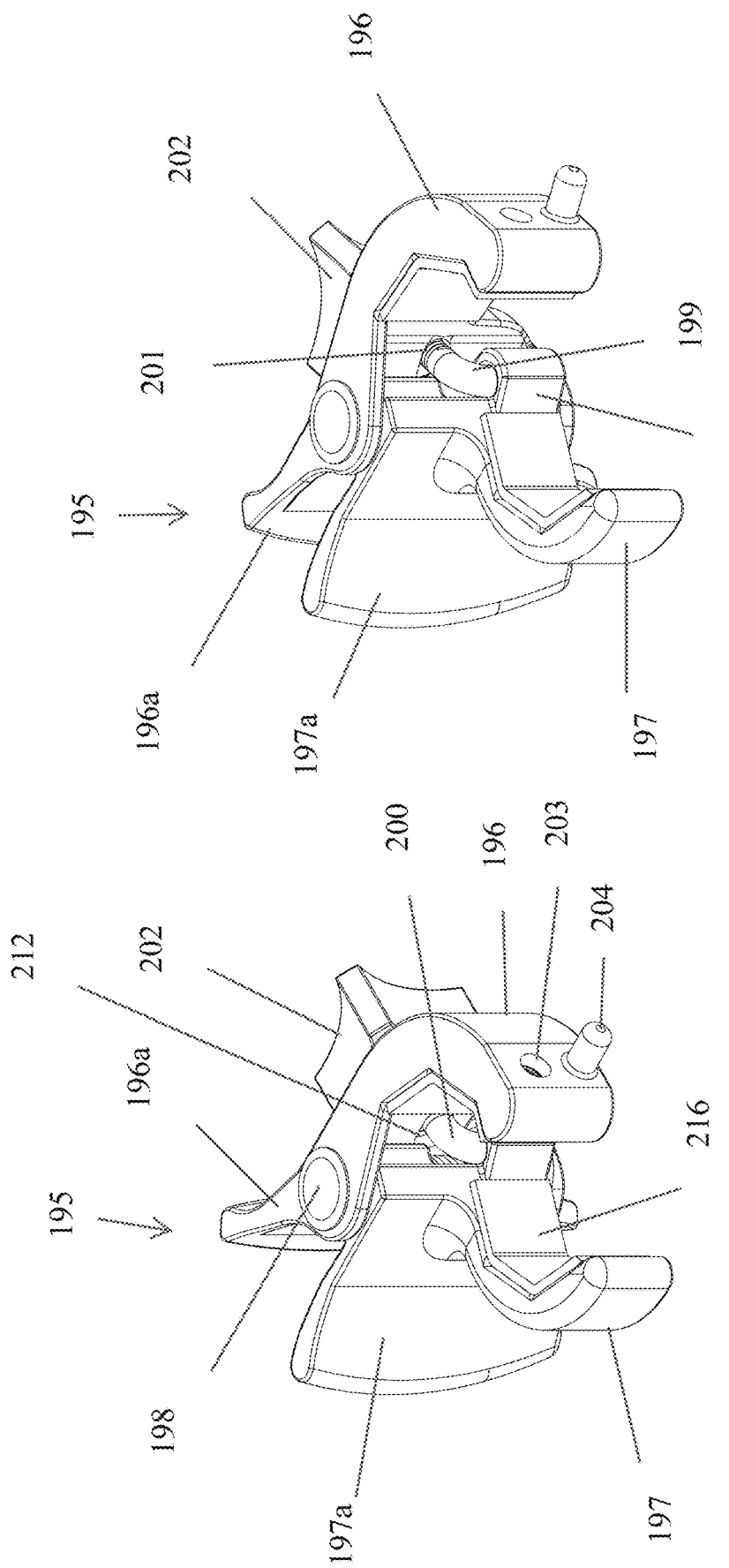

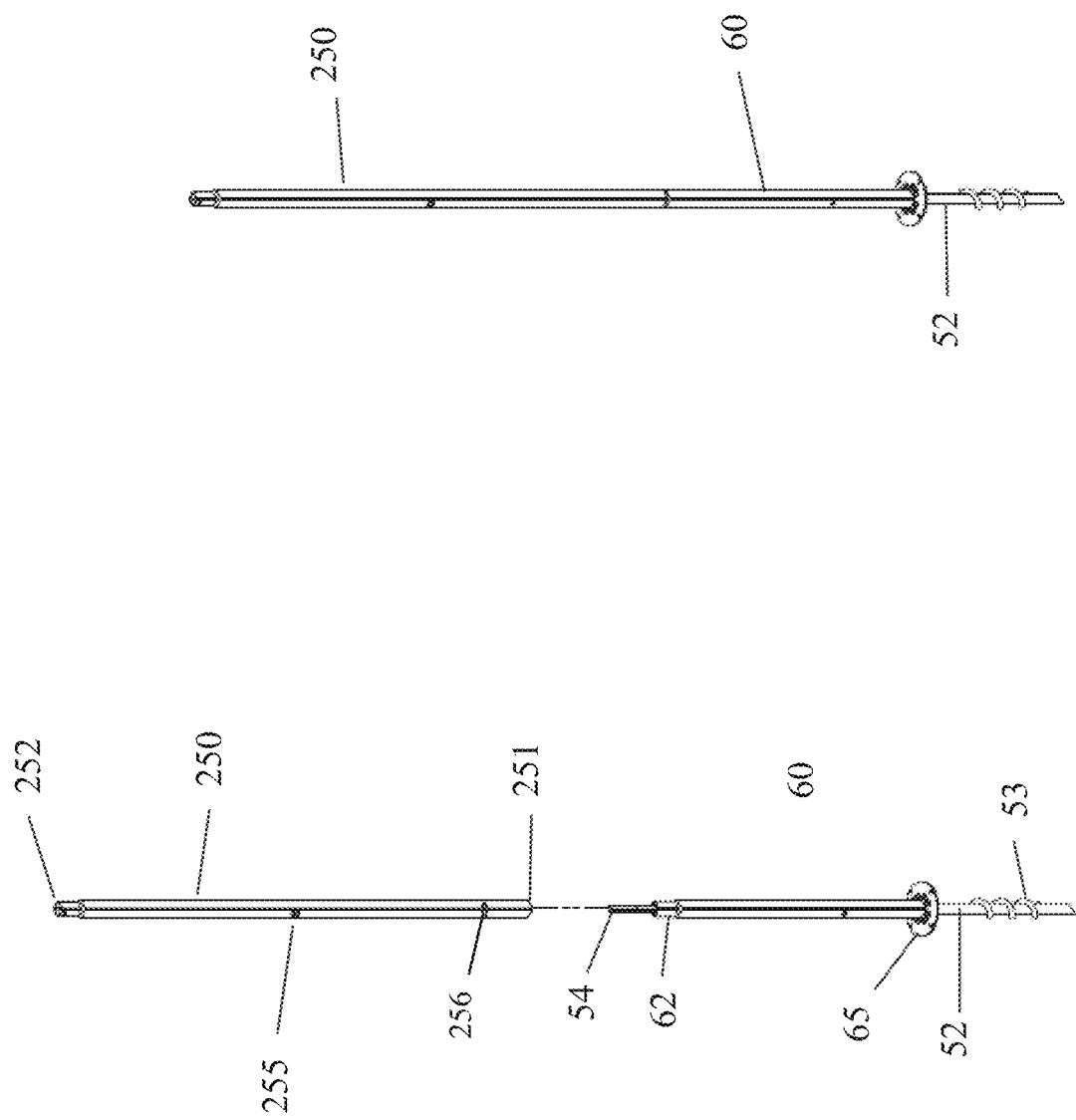

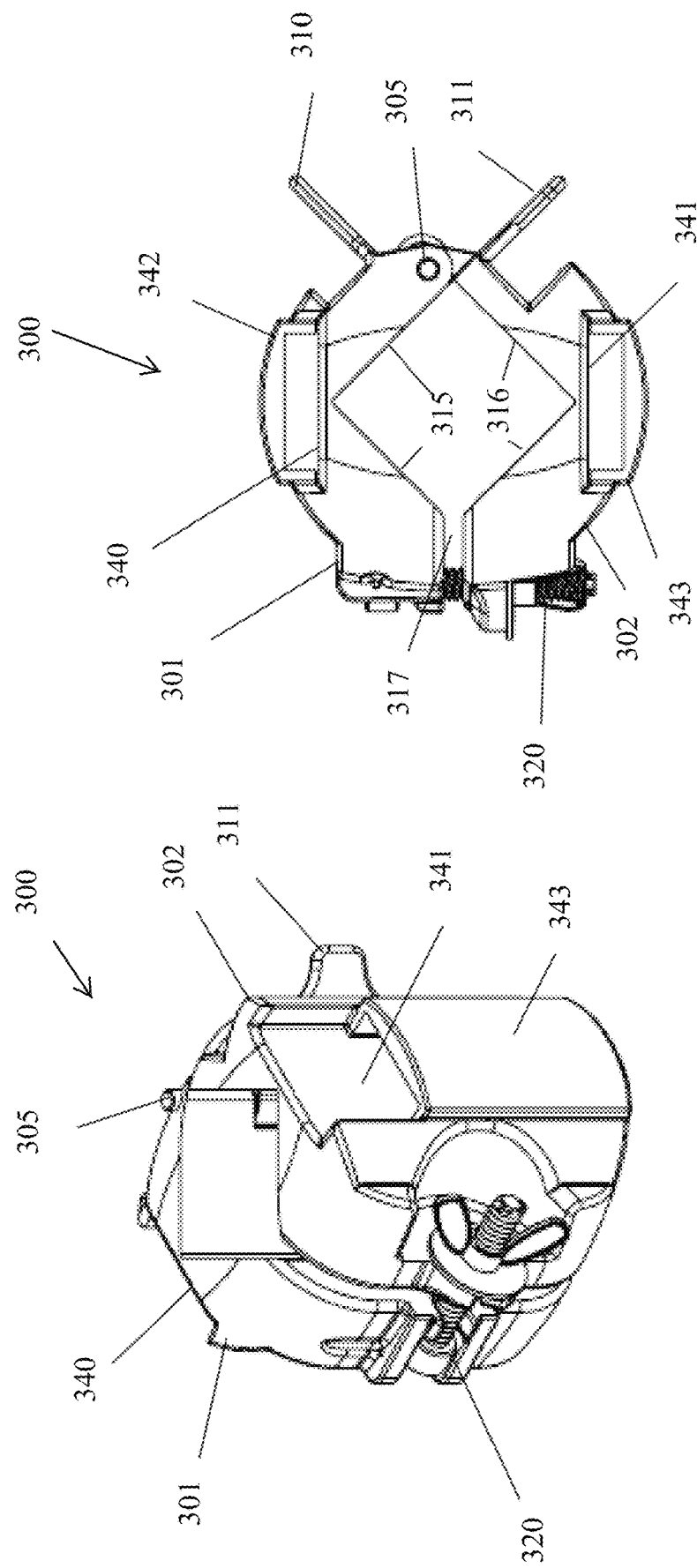

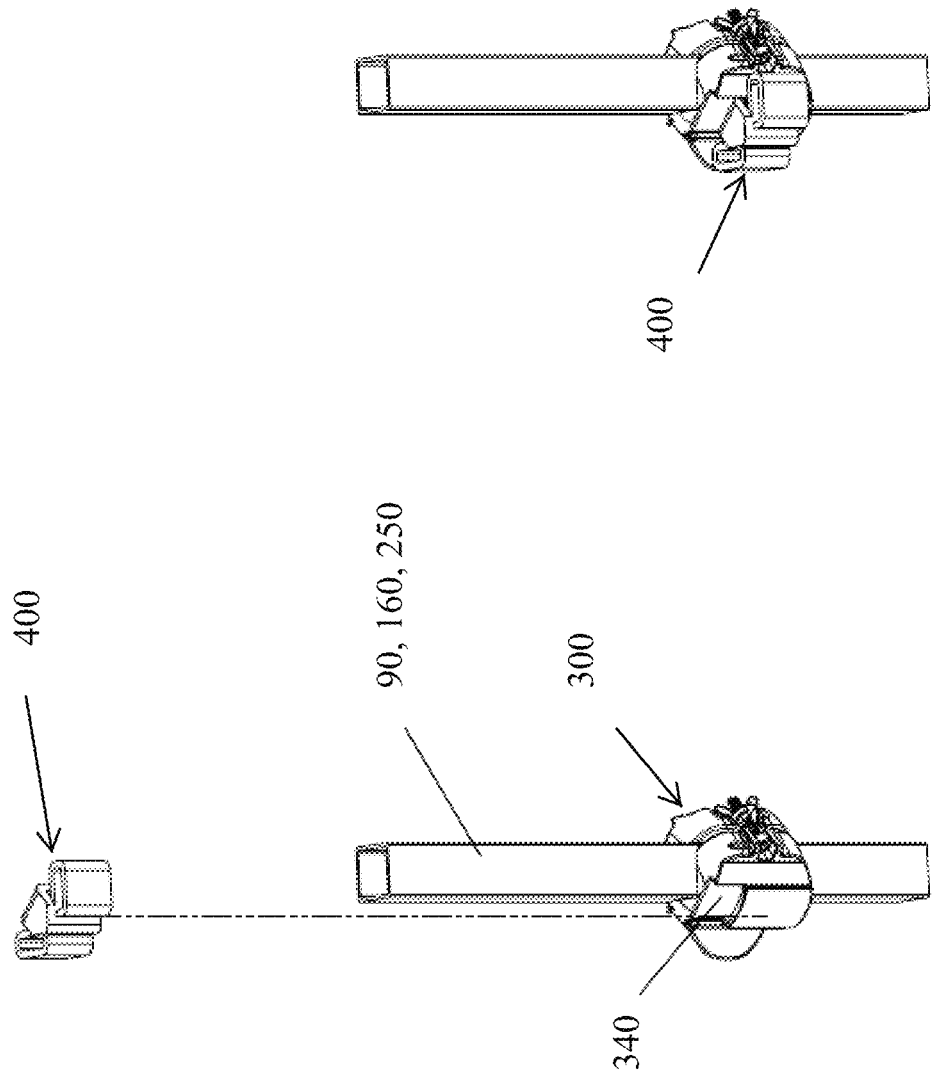

MODULAR BIRDING ACCESSORY POLE SYSTEM

PRIORITY CLAIM

This application is continuation-in-part of U.S. application Ser. No. 17/397,255, filed on Aug. 9, 2021, which is a utility filing from and claims priority to U.S. Provisional Application No. 63/064,007, filed on Aug. 11, 2020, the entire disclosure of which is incorporated herein by reference.

BACKGROUND

The present disclosure is for a pole system for use in supporting birding accessories, such as bird feeders, perches, houses and the like.

For quite some time, birding has been a very popular hobby. Many people find that watching birds is a pleasant, relaxing, and educational way to spend time and observe nature. Although some bird watching is performed in a nature preserve-like settings, such as at parks and forests, much bird watching also occurs in and around the homes and yards of the bird watchers. To help better attract birds to watch, many people erect various bird attracting devices such as bird houses, feeders and baths. Along with the bird houses, feeders and baths, mounting hardware must be employed in order to place the bird house or bird feeder at a desired location. This mounting hardware can be as simple as a rope or wire that ties the bird attracting device to the branch of a tree, or a plurality of nails that nail a bird house, feeder or bath to a tree or a wall.

In addition to this rudimentary hardware, more elaborate hardware exists such as mounting brackets and poles onto which a bird attracting device may be hung. One example of a popular mounting pole is shown and described in U.S. Pat. No. 6,386,142, which issued on May 14, 2002, the entire description of which is incorporated herein by reference. In general terms, the mounting pole assembly 10 includes a pole 12 that includes an auger end 14 configured for threading into the ground, as shown in FIG. 1. A stabilizer 15 is mounted on the pole 12 by a collar 17 and held in place by tightening a thumb screw 18 onto the pole. The stabilizer 15 includes a number of tines 16 that are pushed into the ground as the collar 17 is slid downward along the pole after the auger end 14 has been fully threaded into the ground. The assembly 10 also includes accessories 20 that are mounted at various heights along the pole 12. The assembly includes mounting collars 21 that support the accessory 20 and that are fastened to the pole by a thumbscrew 22, in the same manner as the stabilizer. Once the pole 12 and stabilizer 16 have been placed in the ground the accessories 20 can be added with the mounting collars 22. After the accessories have been added, the feeder mounting assembly 25 can be mounted on top of the pole 12 by placing the collar 26 on the end of the pole. The assembly 25 includes two or more arms 27 that extend outward to support bird feeders 28.

While the pole assembly 10 has been a commercial success, there are certain detriments inherent with the design of the assembly. One particular detriment is that the entire assembly requires a relatively sizable package for shipping the product to a retailer. More specifically, the stabilizer 15 and feeder mounting assembly 25 tend to dictate the overall circumference of the packaging since the tines 16 project outward from and are affixed to the collar 17 and by the arms 27 of the feeder mounting assembly. Another detriment is that the mounting collars 21 inherently limit the vertical location of the accessories 20, and in particular prevents multiple accessories from being placed at the same or nearly the same height along the pole. The mounting collars 21 must also be threaded onto the pole before the feeder mounting assembly 25 can be added. A further detriment is that the stabilizer 16 can be difficult to adjust after the pole assembly has been use for a while.

SUMMARY OF THE DISCLOSURE

A pole system is provided for supporting birding accessories, such as bird feeders, perches or bird houses, the pole system comprising an elongated hollow outer tube with a swaged upper end and disk attached at a bottom end that is configured to engage the ground. An elongated post includes an auger at one end configured to be driven into the ground and an opposite end configured to engage a tool for rotating the post. The pole system further includes an elongated hollow extension tube having an open first end configured to be engaged on the swaged upper end of the outer tube. The extension tube defines a cross-bore passing transversely through the extension tube, in which the cross-bore is sized and configured to engage the opposite end of the elongated post so that the extension tube can be used as the tool for rotating the elongated post to drive said auger into the ground.

In another aspect of the disclosure, the pole system includes a clamp configured to releasably engage the outer surface of the outer tube. The clamp includes opposite jaws pivotably connected to each other by an axle extending through colinear bushings included on one side of each of the opposite jaws. The opposite jaws each include a pair of inner surfaces configured to form a non-circular cross-section when the jaws are closed to engage the outer surface of the outer tube. A locking mechanism is provided between the opposite jaws on a side of the jaws opposite the axle, in which the locking mechanism is configured to lock the opposite jaws together when the jaws are closed about the outer tube. At least one jaw, and preferably both jaws, includes an elongated recess along a side the jaw between the axle side and the opposite side thereof. An accessory is provided that includes an elongated tongue sized and configured for removable slidable engagement within the elongated recess.

In a further feature, a doubler is provided that increases the number of accessories that can be supported by the pole system. The doubler includes a pair of sleeves, each sized and configured to removably receive the elongated tongue of the accessory. A mounting plate is connected to and supports the pair of sleeves, in which the mounting plate is sized and configured for removable engagement within the recess of the clamp.

DESCRIPTION OF THE DRAWINGS

FIGS. 3A-3D are side views of the mounting pole assembly of FIG. 2 shown in different stages of installation.

FIG. 3E is an enlarged view of a tool for use during installation of the mounting pole assembly.

FIGS. 4A and 4B are perspective views of a clamp for use with the pole assemblies of FIGS. 2 and 6, with the clamp shown in its closed and opened configurations.

FIGS. 7A and 7B are perspective views of another embodiment of a clamp for use with the pole assembly of FIGS. 2 and 6, with the clamp shown in its closed and opened configurations.

FIGS. 8A-8D are perspective views of an extension tube for use with the pole assemblies disclosed herein and for use as a driving tool for the pole assemblies.

FIGS. 9A-9C are perspective, top and exploded views of a clamp for use with the pole assemblies disclosed herein.

FIGS. 13A-13B are perspective views of the doubler of FIGS. 12A-12C mounted to a clamp engaged to a pole or extension tube.

DETAILED DESCRIPTION

Figure 1:
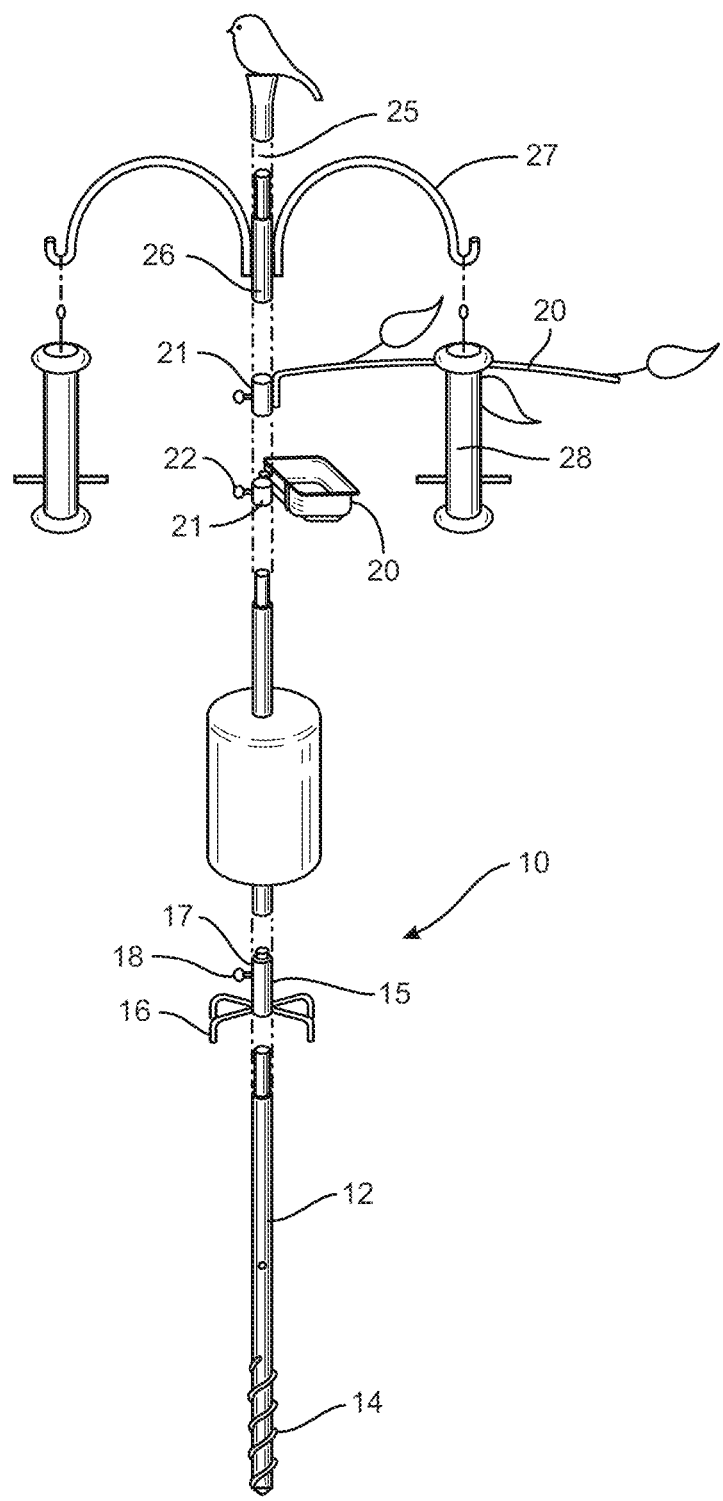
FIG. 1 is a perspective view of a mounting pole assembly of the prior art.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
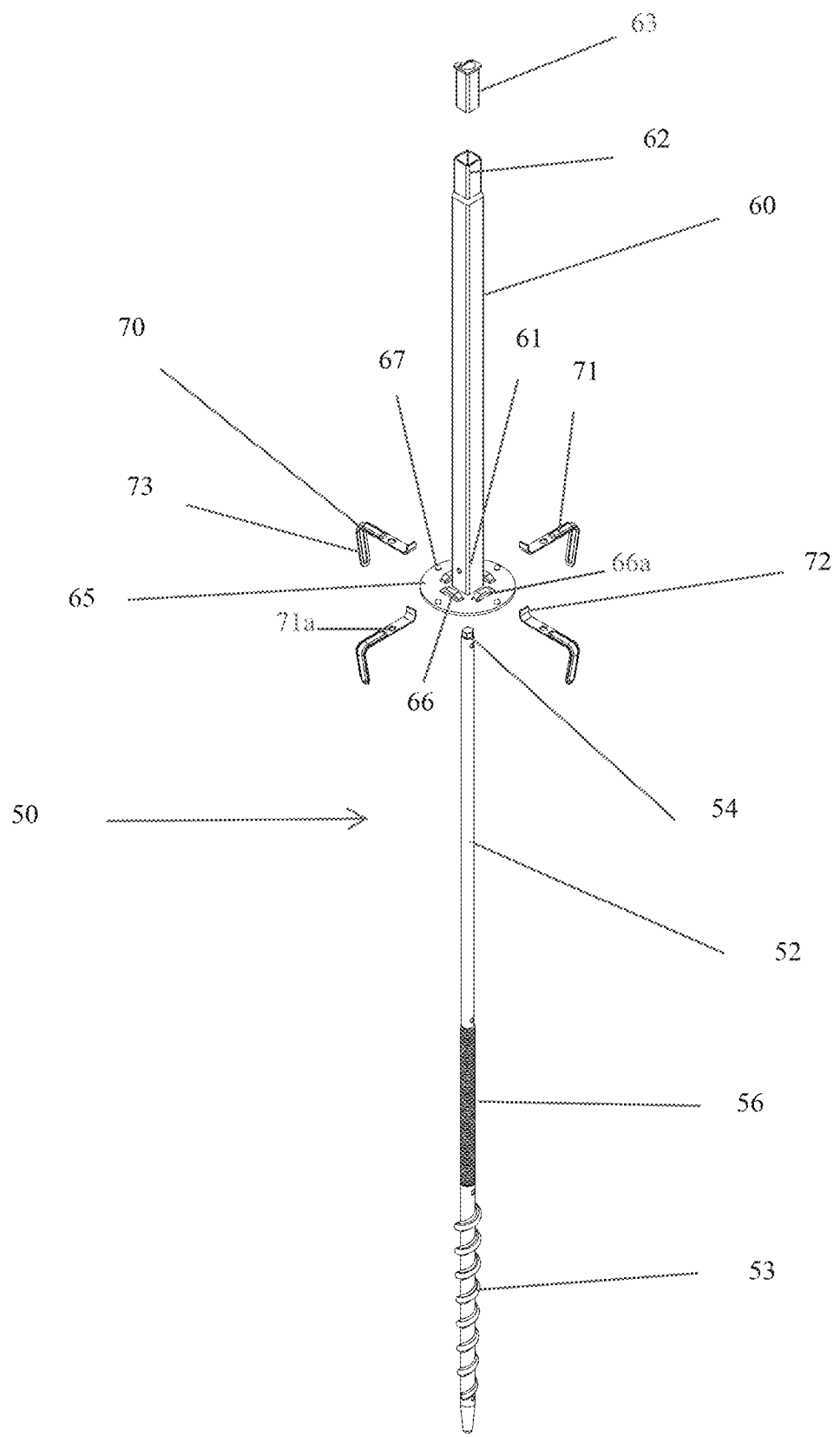
FIG. 2 is an exploded view of the components of a mounting pole assembly according to the present disclosure.

According to one embodiment of the present disclosure, a pole assembly 50 includes a pole 52 that terminates at one end in an auger end 53, as shown in FIG. 2. The auger end is configured to be initially pushed into the ground and then advanced into the ground by rotating the auger end in the clockwise direction in the illustrated embodiment. The upper end 54 of the pole 52 is configured to engage a driving tool, such as the tool 80 shown in FIG. 3A. The tool 80 can include a hex socket 81 with the upper end 54 having a complementary hex configuration to be received within the socket. The tool 80 includes a male end 82 that can be configured to engage the socket of a power drill. The tool 80 can thus be used to drive the auger end 53 into the ground. The upper end 54 can also be engaged by a manual tool, such as a wrench, to manually rotate the auger end. The pole 52 includes machine threads 56, such as Acme threads, adjacent the auger end 53 that are configured to receive the upper tube assembly 60 as described in more detail herein.

In one embodiment, the upper tube assembly 60 includes a square tube 61 that is sized to fit over the pole 52 when the auger end 53 is fully engaged in the ground, as shown in FIG. 3B. However, the square tube 61 has a length less than the length of the pole from the upper end of the auger end 53 to the upper end 54 of the pole so that a portion of the pole 52 is accessible above the end of the square tube. The square tube 61 has a swaged end 62 that is configured to receive an extension tube, such as tube 90 shown in FIG. 3D. A bushing 63 is configured to fit over the swaged end 62 of the tube assembly 60. The bushing has an opening sized for a close running fit with the pole 52 to center the pole within the square tube assembly 60.

The opposite end of the square tube 61 includes a stabilizer disk 65 affixed to the tube. The stabilizer disk 65 can define internal threads (not shown) to mate with the threads 56 of the pole 52. The threaded interface between the disk and pole can include counter-clockwise threads relative to the clockwise direction of the thread in the auger end 53. The tube assembly 60 can be mounted onto the pole 52 by threading the disk 65 onto the threads 56. Subsequent rotation of the pole 52 by the tool 80 won't unseat the square tube 60 from the pole since the thread directions are the same.

The stabilizer disk 65 is configured to contact the ground when the auger end 53 is fully engaged within the ground, as shown in FIG. 3B, and the square tube 61 is threaded down onto the threads 56. The stabilizer disk 65 defines a plurality of upraised flanges 66 that form open slots 66a facing the square tube 61, as shown in FIG. 2. Each slot 66a is configured to receive a corresponding stake 70, and in particular an upturned end 72 of the stake. The stake 70 includes a radial leg 71 from which the upturned end 72 extends and from which a downturned leg 73 extends. The upturned end 72 of the stake is configured to be introduced into the slot 66a and to allow the leg to be pivoted downward toward the disk 65 until the upturned end 72 is in contact with or immediately adjacent the square tube, as shown in FIG. 3A. In this position, the radial leg 71 rests on the top surface of the disk 65. The disk 65 can include an upward-facing dimple 67 arranged to engage a hole 71a in the radial leg 71 of the leg to help prevent the stake from being dislodged from the upraised flange 66.

The downturned leg 73 of the stake 70 is oriented at an acute angle relative to the radial leg 71, as seen in FIG. 3C. The angle of the leg 73 is calibrated to match the direction of pivoting of the leg when the upturned end 72 is engaged within the flange 66. As a result, when the disk 65 is in contact with the ground, as shown in FIG. 3C, the stakes 70 can be added to the assembly 50 with the downturned legs 73 aligned to be pushed into the ground as the leg is pivoted. In one specific embodiment, the acute angle between the radial leg 71 and the downturned leg 73 is about 80°. Four legs spaced at 90° intervals are provided for stability in all directions.

The installation of the assembly 50 is depicted in FIGS. 3A-3D. The tube assembly 60 is placed over the pole 52 and is at least partially threaded onto the threads 56 so that the upper end 54 of the pole is accessible for engagement with the driving tool 80. Although the stakes 70 are shown mounted on the disk 65 in FIGS. 3A-3B, the stakes are preferably not installed until the disk 65 is properly seated on the ground, as shown in FIGS. 3C-3D. The pole can be rotated to drive the auger end 53 into the ground until the auger end is completely threaded into the ground, such as by using the tool 80 and power drill as described above. A tool 85 is provided that is configured to rotate the tube assembly 60 to advance the tube assembly down the machine threads 56 of the pole 52. As shown in FIG. 3E, the tool 85 includes a "tuning fork" portion 86 that is configured to be placed around the square tube 61. The tool 85 can be manually turned, by grasping the extension 87, to thread the threaded disk 65 down the threads 56 of the pole, as depicted in FIG. 3A. In another approach, with the tuning fork 86 still engaged to the tube 61, an extension tube 90 can be passed through a collar 88 sized to receive the extension tube. The extension tube 90 can now serve as a lever arm to facilitate rotation of the tube assembly 60 onto the pole. It is understood that the auger end 53 can be at least initially driven into the ground manually, but that as the auger end drills deeper into the ground it becomes more difficult to rotate the auger end. The tool 85 can be used to help drive the auger into the ground. In this aspect, the outer tube 61 is rotationally fixed to the inner pole 52. In one embodiment, the different direction of the threaded interface 156 and the auger thread 53 allows the outer tube to be rotated in the clockwise direction of the auger thread without rotating the threaded interface. Alternatively, the outer tube can be fastened to the inner post by a set screw (not shown) advanced into the screw hole 60a. In either case, with the tube and pole fixed to rotate together, the extension tube 90 adds a long lever arm to the tool 85, providing a significant mechanical advantage to drive the auger end 53 to its full depth in the ground.

As shown in FIG. 3B, the square tube 60 need not be fully advanced onto the machine threads of the pole 52 as the auger 53 is driven into the ground. Once the auger is at a suitable depth, the outer tube 60 can be advanced along the threads 56 until the disk 65 contacts the ground. It is noted that the stakes 70 are not engaged to the disk 65 at this time. The tuning fork 86 can be used to rotate the square tube 60, and is particularly beneficial to rotate the tube one or two full rotations so that the bottom face of the disk 65 is slightly embedded within the ground. This step can help level the pole assembly as well as tighten the auger end by compressing the disk into the ground. The stakes 70 can then be introduced into the disk 65 as described above, with the downturned legs 73 being driven into the ground as the stakes are pivoted on the disk.

It is contemplated that the pole 52 and auger end 53 can be driven into the ground with or without the tube assembly 60 in position on the pole. Thus, in one approach, the auger end 53 can be driven into the ground using the tool 80 with a power drill until the machine threads 56 are at the surface of the ground. The tube 61 can then be threaded onto the machine threads 56 either manually or using the tool 85 and tuning fork 86.

In another aspect, rather than using the tool 80 to drive the auger end 53 into the ground, the tool 85 can be provided with a socket 87, similar to the socket 81, which is configured to engage the upper end 54 of the pole 52. The tool 85 can then be used to drive the auger end 53 into the ground— manually at first, if desired, and then using the extension tube 90 as a lever arm engaged within the collar 88. The tool 85 is thus a multi-use tool capable of driving the auger end 53 into the ground, either by engaging the end 54 of the pole 52 with the socket 87 or by engaging the outer surface of the tube 61 with the tuning fork 86. The tool 85 also provides the user with a significant lever arm and mechanical advantage, via the engagement of the extension tube 90 with the collar 88, to drive the auger end to its full depth within the ground.

The installed configuration of the pole assembly 50 is shown in FIG. 3C. The grommet 63 can be mounted within the swaged end 62 of the square tube to align the pole 52 within the tube. An extension tube 90 can then be mounted over the swaged end 62, as shown in FIG. 3D. A set screw or other fastener (not shown) can be advanced through a screw hole 90a to hold the extension tube 90 on the swaged end 62 of the tube assembly 60.

Figure 8D:
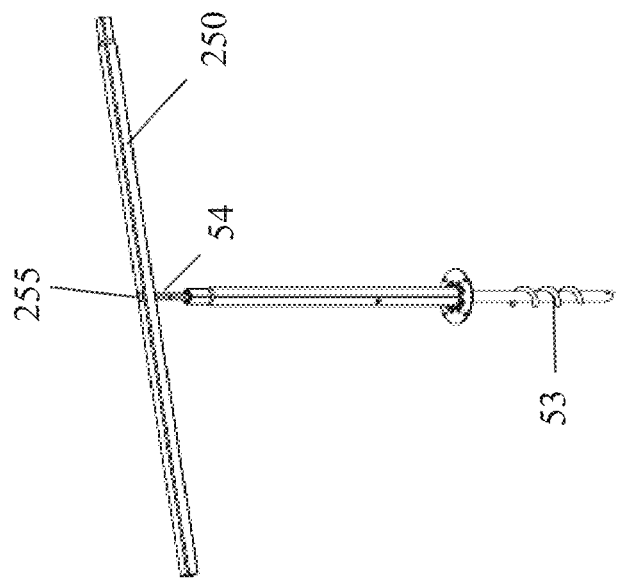
Figure 8C:
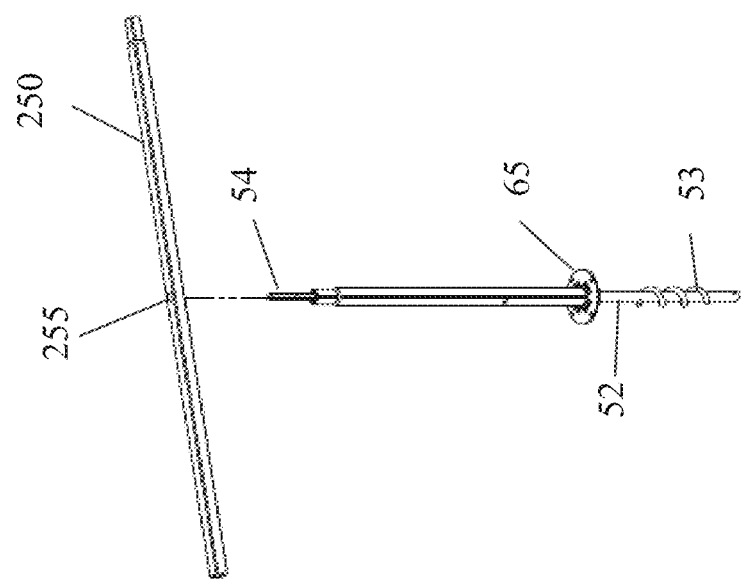

Another extension tube 250 can be provided as illustrated in FIGS. 8A-8D. The extension tube 250 includes an open end 251 configured to engage the swaged end 62 of the tube assembly 60, as shown in FIG. 8B. The opposite end 252 of the extension tube can include its own swaged end 252 to receive the bushing 63 or to support another accessory. The extension tube 250 further includes a cross-bore 255 extending transversely through the extension tube. The cross-bore 255 is configured to engage the upper end 54 of the pole 52. In one embodiment, the cross-bore and upper end can have complementary non-circular cross-sections, such as square or hex cross-sections. As shown in FIG. 8C, the extension tube 250 can be oriented perpendicular to the pole 52 and then positioned with the upper end 54 of the pole extending through the cross-bore 255, as shown in FIG. 8D. The extension tube can then be used as a tool to rotate the pole 52, and ultimately the auger 53 to drive the pole into the ground. Once the auger is buried at a suitable depth, the extension tube can be disengaged from the end 54 of the pole and mounted on the swaged end 62 of the tube assembly 60. The extension tube 250 can also be used in the manner described above for the tube 90 as a lever arm for the "tuning fork" tool 85. The cross-bore 255 is preferably located in the center of the length of the extension tube so that extension tube 250 can be easily rotated when engaged to the upper end 54 of the pole. However, for maximum leverage the cross-bore 255 can be positioned close to one end of the extension tube 250. In an alternative embodiment, a second cross-bore 256 can be added adjacent the end 251, the end 252, or both ends. The cross-bore 255 can be the primary point of engagement to drive the auger 53 into the ground, while the alternative cross-bore 256 can be used when additional leverage is required to rotate the auger.

Returning to FIG. 5, the extension supports bird feeder arms 91 using the clamp 95 shown in FIG. 4. As can be appreciated from FIG. 5, the two arms 91 are arranged at the same height on the extension 90, akin to the bird feeder arms 27 of the prior art assembly 10. However, unlike the prior art assembly, the bird feeder arms 91 are separate from each other and from the clamps 95. This allows for much more compact packaging of the complete assembly 50. The same is true for the stabilization stakes 70 which are provided separate from the stabilization disk 65. The assembly 50 of the present disclosure can fit into packaging with a maximum lateral dimension slightly greater than the dimension of the curved bird feeder arms 91 and a maximum length slightly greater than the length of the pole 52.

With reference to FIG. 4, the clamp 95 includes an upper jaw 96 and a lower jaw 97 that are pivotably connected at a pivot 98. The pivot can be a press-fit pin extending through overlapping portions 96a, 97a of the two jaws. Alternatively, a rivet can each adjacent pair of portions 96a, 97a to each other at opposite vertical sides of the clamp. The two jaws are arranged so that they do not overlap each other laterally relative to a vertical axis through the pivot 98. In other words, the bottom surface 96a of upper jaw 96 is generally coplanar with the top surface 97a of the lower jaw 97. This allows two clamps to be placed in the overlapping arrangement shown in FIG. 5, with the upper jaw 96 of one clamp facing the lower jaw 97 of the second clamp 95', with the second clamp "flipped over" relative to the first clamp. Likewise, the lower jaw 97 of the first clamp 95 faces the upper jaw 96 of the second clamp 95'. This feature of the clamp allows two clamps to be mounted on the square tube parallel to each other and with the mounting feature (described below) of the two clamps 1800 opposite each other.

A locking assembly 99 is provided that includes a screw 99a that extends through aligned slots 100 in each jaw and a wing nut 99b for threaded engagement with the screw. When the wing nut is fastened to the screw, the clamp jaws cannot be opened, as shown in FIG. 4A. When the screw 99a and wing nut 99b are removed, as shown in FIG. 4B, the jaws 96, 97 of the clamp can be moved apart. When the clamp is positioned on the extension tube 90, or the square tube 60, the jaws are closed around the tube and the locking screw 99 tightened to lock the clamp at the pivot 98. It is contemplated that the locking screw can be spring biased to push the jaws apart. The locking screw can also be fixed to the clamp so that it cannot be removed; only loosened to allow the clamp to open.

Figure 5:
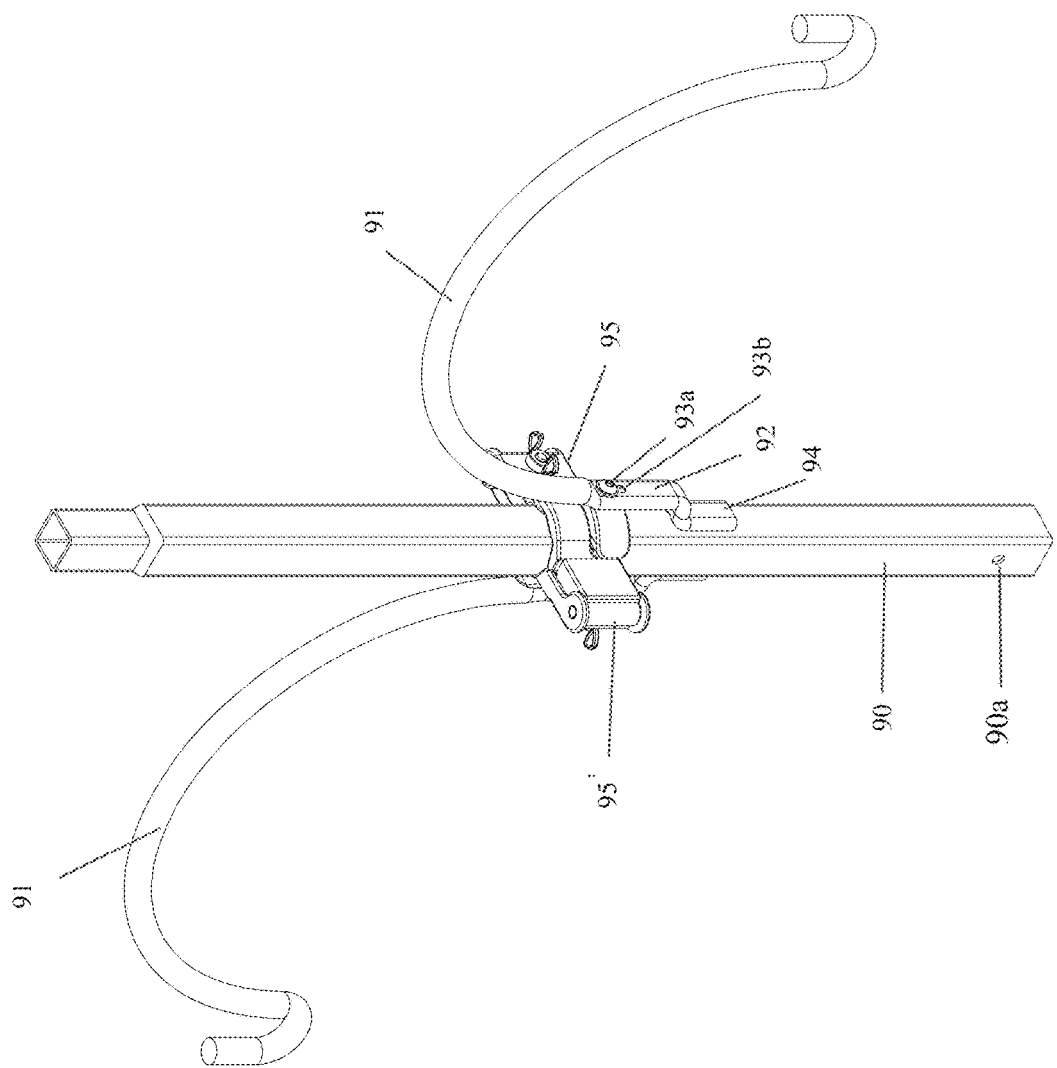
FIG. 5 is an enlarged perspective view of an accessory mounted to the pole assembly of FIG. 2 using the clamps of FIGS. 4A-B.

As shown in FIG. 4A, B, the lower jaw 97 of the clamp includes a mounting face 102 that define a mounting feature including a threaded bore 103 and a projection 104. As shown in FIG. 5, the bird feeder arm 91 includes a mounting bracket 92 that defines a locking screw 93a and an opening 93b to receive the projection 104. The locking screw 93a is threaded into the bore 103 to lock the arm 91 to the clamp. The bird feeder arm 91 includes a lower flange 94 that rests against the extension tube 90 (or square tube 60) when the clamp is engaged to the tube. It can be appreciated that the bird feeder arm 91, or other accessory with a similar flange construction, can be attached to the clamp 95 prior to or after engaging the clamp on the tube. As noted above, the clamp is configured so that two clamps can be mounted on the square pole immediately adjacent each other with the mounting faces 102 of the clamps 180° opposite each other to support two accessories, such as two bird feeder arms 91, on opposite sides of the pole assembly.

The upper and lower jaws 96, 97 include a central face 112 flanked by faces 110, 111 that define corners 113, 114. The central face 112 is sized to the width of the extension tube so that the central face can be clamped flush against the surface of the square tube 90 or 60. Alternatively, the clamp can be rotated 45° so that the corners 113, 114 engage the corners of the square tube 90 or 60. This feature allows the clamp, and any associated accessory mounted to the clamp, to be supported at eight orientations around the square tube, rather than simply four. Thus, the clamp 95 can emulate the cylindrical collar 21 of the prior art assembly 10 that allows a 360° range of positions, while retaining the feature of a square tube that prevents the clamp and accessory from rotating relative to the tube. The inside of the jaws 96, 97 can include a rubber pad 116 to enhance the grip of the clamp on the tube 90, 60.

The components of the pole assembly 50 can be formed of a variety of materials capable of withstanding the elements. For instance, at least the auger end 53 of the pole 52 and the stakes 70 can be formed of powder coated steel to resist corrosion while embedded in the ground. The square tube 60 of can be formed of brushed stainless steel for aesthetic purposes and for resistance to rain and sun. The clamps 95 can be formed of die cast aluminum or of a rigid plastic.

Figure 6:
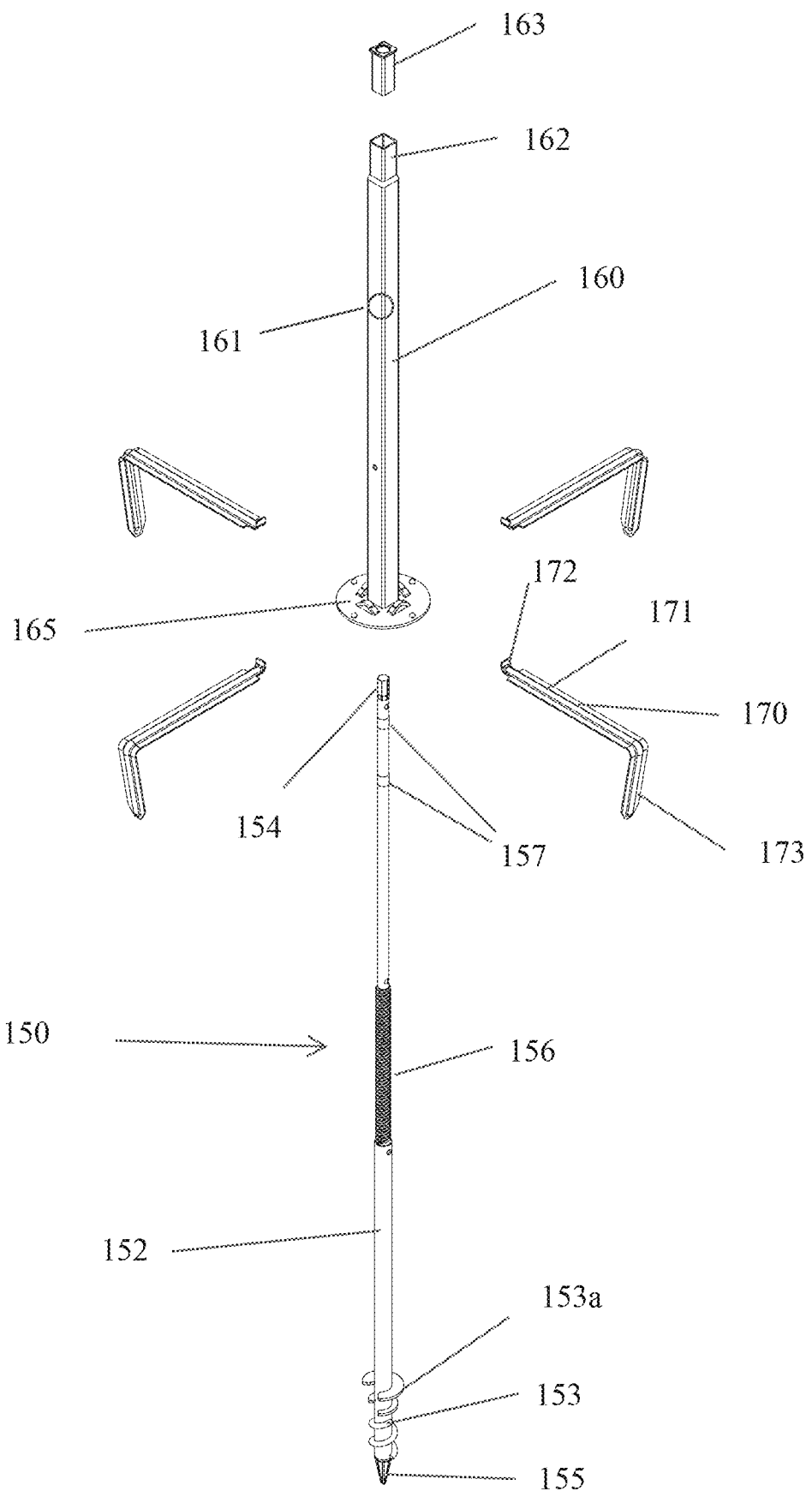
FIG. 6 is an exploded view of the components of a mounting pole assembly according to another embodiment of the present disclosure.

The pole 52 can be provided in a variety of lengths, with a preferred above-ground height of 24 inches. The auger end 53 can have a length of 8-10 inches to provide sufficient purchase in the ground to keep the pole assembly in a vertical orientation. The tube 60 can have a length of 16-20 inches and be 2×2 inch square. The disk can have a diameter of 4 inches. Of course, other dimensions are possible, although care must be taken that the height of a fully loaded assembly is not so high in relation to the depth of the auger end in the ground as to render the assembly unstable. In addition, other configurations of the tube 60 and extension tube 90 are contemplated, including circular. The radial leg 71 of the stakes can have a length of 3 inches and the downturned leg 73 can have a length of 2-2½ inches to be embedded into the ground. For added stability, the stakes can have a radial leg length of up to 9 inches and a downturned leg length of up to 6 inches, provided that the stake retains the ability to be engaged to the disk 65 while the stakes are embedded into the ground, as described above A pole assembly 150 is modified from the pole assembly 50, as shown in FIG. 6. The pole assembly 150 includes a pole 52 with an auger end 153 at one end, an upper end 154 configured to receive the driving tool, such as tool 80 described above, and intermediate machine threads 156. The pole 152 is similar to the pole 52 with some modifications. In particular, the auger end 153 is shorter than the auger end 53 which can make driving the auger end into the ground easier for the user. Thus, in this embodiment, the auger end 153 has a length of 3-4 inches. The thread of the auger end can be tapered so that the uppermost segment 153a of the thread is larger to help stabilize the pole within the ground. The pole 152 can still be driven into the ground the same depth as the pole 52, but having a shorter auger end 153 reduces the resistance as the auger end is threaded into the ground. In another modification, the auger end 153 includes a tip 155 that is formed of plastic rather than as a welded tip to the auger. The tip 155 can be press-fit or snap-fit into the auger end 153 in a known manner.

The upper end 154 of the pole is longer than the end 54 of the prior embodiment, which can make it easier for the user to engage the driving tool 80 to the hex feature of the end 154. In another modification, the machine threads 156 are disposed further up the pole 512 from the auger end 153 than the machine threads 56 of the pole 52. This increased height moves the machine threads 156 farther from the ground when the pole assembly 150 is installed, thereby more effectively hiding the machine threads from the elements. For a pole with a 24 inch above-ground height, the threads can be centered at the halfway position on the pole. The threads 156 are configured to engage internal threads 161 defined in the outer tube 161. However, since the machine threads 156 are at a greater height on the pole 152, the internal threads of the tube 161 are positioned farther up the interior of the tube so that the stabilizer disc 165 can contact the ground when the pole assembly 150 is installed. In this embodiment, the internal threads 161 can be 10-12 inches from the disc 165 for a 16-20 inch tube 160.

The pole assembly 150 includes an outer tube 160 with a swaged end 162 to receive a bushing 163, similar to the outer tube 60. The tube 160 also includes a flange 165 at the lower end configured like the flange 65 of the prior embodiment. The outer tube 160 can be square like the tube 60 and can be installed in the same manner. The flange 165 is configured to receive a plurality of stakes 170 in the same manner described above. The stakes 170 are generally configured like the stakes 70, including the radial leg 171, upturned end 172 and downturned leg 173. However, in one modification, the radial leg 171 of the stakes 170 is longer than the radial leg 71 of the stakes 70. In one specific embodiment, the radial leg has a length of 5-6 inches. The longer stakes increase the stability of the pole assembly 150 when it is mounted in the ground since the anchor is radially wider than the anchor of the pole assembly 50. The extra radial length also allows the user better access to push the downturned legs 173 into the ground with his/her foot.

In another modification, the pole 152 can include a pair of knurled portions 157 spaced apart relative to each other and relative to the end 154 of the pole. The knurled portions provide a visual indicator to the user as to whether the pole 152, and auger end tip 153, needs to be threaded further into or further out of the ground. The knurled portions can constitute other surface treatments of the pole 152 that can be readily distinguished over the un-treated portion of the pole. The portions 157 can constitute strips affixed or adhered to the pole at the two locations, although the strips are susceptible to wear when exposed to the elements. A surface feature defined in the pole is less likely to wear and is therefore more likely to remain visible to the user throughout the life of the pole assembly 150. In use, the outer tube 165 can be threaded to the end of the threads 156 of the pole, at which point the outer tube is effectively fixed to the pole. The hex end 154 can be engaged with a driving tool to thread the auger 153 into the ground until the disk 165 contacts the ground. Once the disk contacts the ground, the pole can be rotated further relative to the outer tube 165 (since the outer tube is held against further rotation by the disk) until the lower portion 157 is hidden within the tube. The pole is properly embedded within the ground when the upper end 162 of the tube is between the two knurled portions. Once the pole 152 is properly positioned, the outer tube can be rotated relative to the pole (since the pole is held against further rotation by the auger) to embed the disk into the ground.

A modified clamp 195, shown in FIGS. 7A-7B, is provided that functions in the same manner as the clamp 95 to facilitate mounting an accessory, such as the bird feeder arms 91, in the manner shown in FIG. 5. Thus, the clamp 195 includes an upper jaw 196 and a lower jaw 197 that are configured to allow two clamps to be mounted on the upper tube 61/161 directly adjacent each other, as described above. Thus, the two jaws are configured to engage the square tube 61/161 in the manner described above. The jaws include the bore 203 and projection 204, that are the same as the bore and projection 103, 104 for the clamp 95 that allow the accessory to be mounted on the clamp. The two jaws are pivotably connected at a pivot 198, which can be configured like the pivot 98 described above. However, in one modification, each jaw includes a lever portion 196a, 197a, respectively, that can be manipulated by the user to move the jaws apart, as seen by comparing the position of the jaws and levers in FIGS. 7A and 7B. The jaws each include compressible pads 216 on the inner faces of the jaws to enhance the grip of the clamp on the tube 61/161.

In another modification of the clamp 195 relative to the clamp 95, a locking assembly 199 is captured within the clamp, in lieu of the separate screw 99a and wing nut 99b of the clamp 95. In this embodiment, the screw 200 is embedded within a boss 211 at the interior of the lower jaw 197, as shown in FIG. 7A. The screw is curved to pass through an opening 212 in the upper jaw 196 with the threaded end 201 of the screw 200 accessible for engagement with internal threads (not shown) of a knob 202. The knob 202 can be held onto the threaded end 201 of the screw by a snap ring (not shown) or other suitable component that allows the knob to be unthreaded along the screw without being removed. As shown in FIG. 7A, when the clamp jaws are closed the screw 200 extends through the opening 201 and the knob 202 can be tightly threaded onto the upper jaw 196 to hold the jaws in position. Alternatively, as shown in FIG. 7B, the knob can be unthreaded from the screw so that the upper jaw can be moved outward relative to the lower jaw, leaving an opening between the jaws wide enough for the clamp 195 to be removed form or mounted on the tube 161. Since the knob is still captured on the screw, there are no loose components for the clamp 195.

In the present disclosure, the pole assemblies 50 and 150 have been described for use in supporting bird accessories. However, the pole assemblies can be adapted to act as a vertical support for other accessories and applications. For example, in one embodiment, the auger ends 53, 153 can be modified to be threaded into a patio deck. In that instance, the disk 65/165 is used to compress the deck material, particularly wood, to effectively clamp the modified auger end into the deck. It is further contemplated that the clamps 95/195 can be used to engage other accessories or components to the pole assemblies 50/150 or other pole or vertical stands. The inner face of the clamp arms 96, 97 (196, 197) can be modified according to the outer geometry of the pole or stand being engaged by the clamp.

Figure 9C:
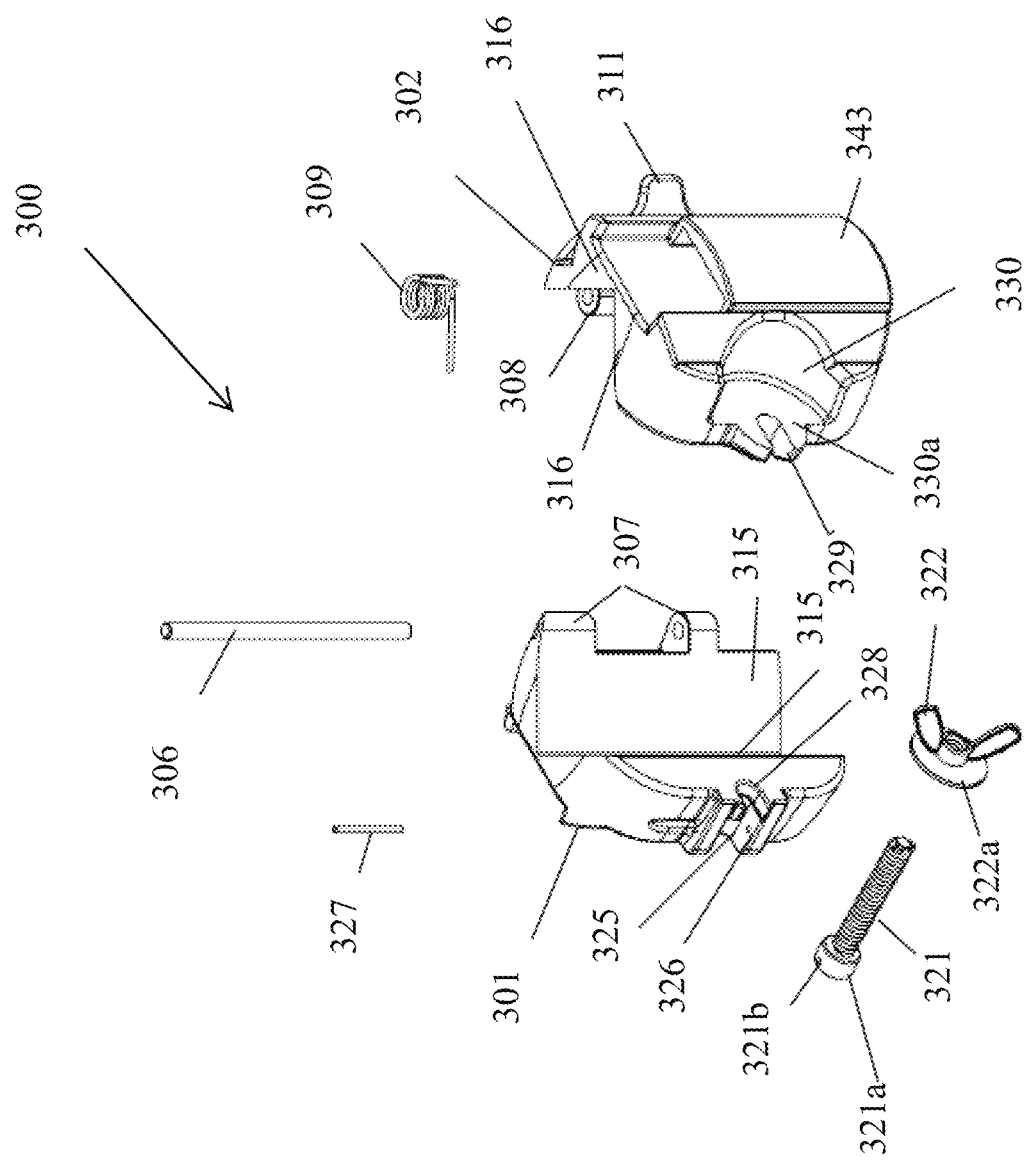
Figure 10D:
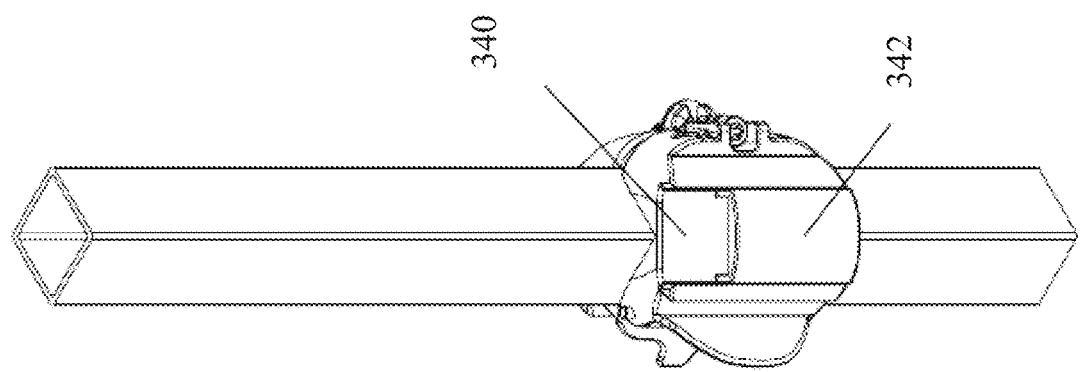
FIGS. 10A-10D are views from each side of a pole or extension tube with the clamp of FIGS. 9A-9C mounted therein.
Figure 10C:
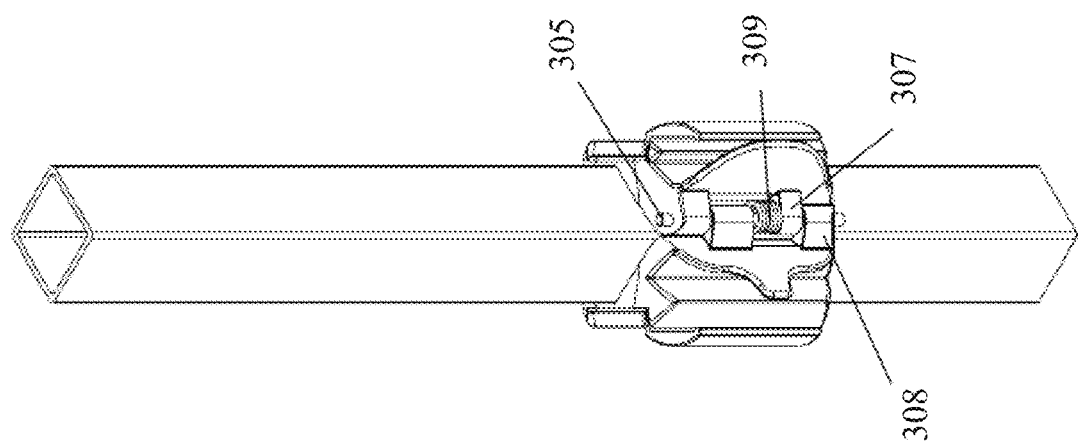
Figure 10B:
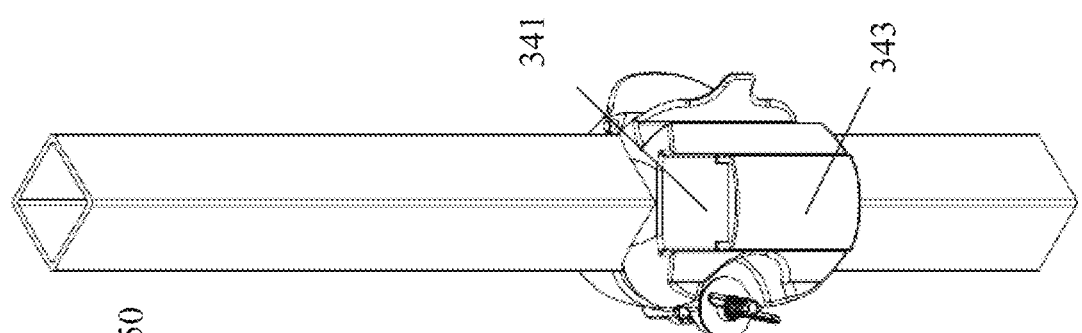
Figure 10A:
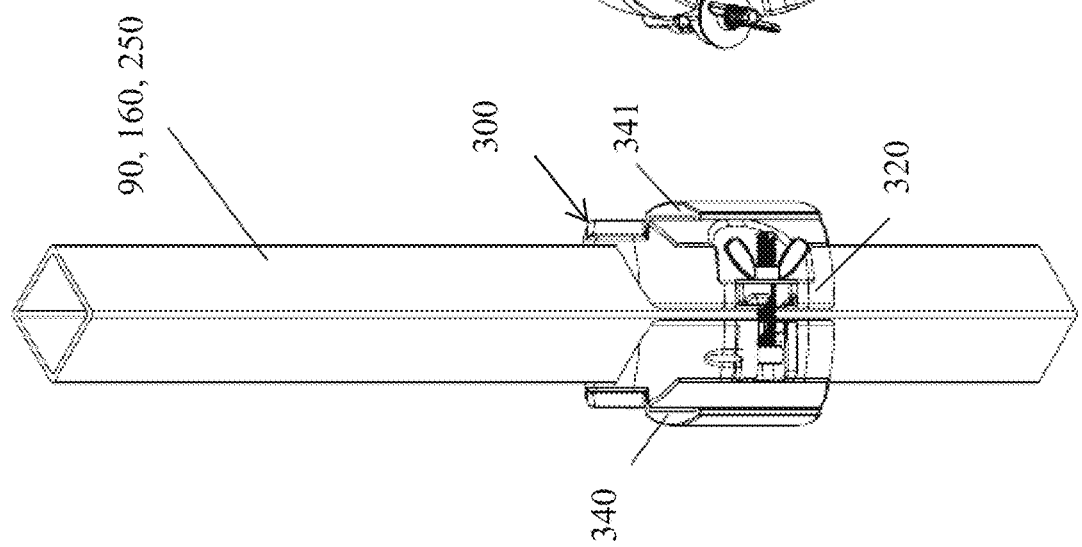

Another clamp according to the present disclosure is shown in FIGS. 9A-11B. Referring first to FIGS. 9A-9C, the clamp 300 includes a pair of opposing jaws 301, 302 that are connected at a pivot 305. The pivot includes an axle 306 that passes through colinear bushings 307, 308 that are integral with the jaws 301, 302, respectively. A torsion spring 309 is threaded on the axle (see FIG. 10C) and is configured to resist separation of the two jaws. The jaws are provided with respective levers 310, 311 that can be manually pinched together to overcome the force of the torsion spring and pivot the two jaws about the pivot 305.

The jaws define engagement faces 315, 316 that are configured to engage the outer surface of a pole, such as the poles 52, 152, or extension tubes, such as tubes 90, 250. In the illustrated embodiment, the poles and extension tubes have a square cross-section, so the engagement faces 315, 316 of the two jaws 301, 302 combine to form a square. As best seen in FIG. 9B, the jaws are configured so that a gap 317 is defined between the two jaws when the clamp 300 is initially mounted on the pole or extension tube. The gap allows the two jaws to be pressed together with the engagement faces 315, 316 firmly engaging the surface of the pole/tube.

A locking mechanism 320 is provided to lock the clamp 300 onto the pole/tube. The locking mechanism includes a bolt 321 that is pivotably mounted within a bolt channel 325 in the clamp jaw 301. The head 321a of the bolt includes a bore 321b that receives a pin 327. The pin 327 extends through a cross-bore 326 across the bolt channel, as best seen in FIG. 9C. The bolt pivots about the pin into and out of the bolt channel. The channel includes a slot 328 that coincides with a slot 329 in the other clamp jaw 302. The slot 329 of the clamp jaw 302 opens in a lock surface 330a of a wingnut channel 330. The wingnut channel receives a wingnut 322 with the washer face 322a of the wingnut pressing against the lock surface 330a when the wingnut is threaded onto the bolt 321. It can be appreciated that the wingnut 322 can be retained on the bolt by swaging the free end of the bolt, thereby preventing the wingnut from completely unthreading from the bolt. The bolt 321 has a length sized so that when the wingnut 322 is unthreaded to the end of the bolt the bolt can pivot freely about the pin 327, releasing the wingnut from the wingnut channel and allowing the two clamp jaws 301, 302 to be pivoted apart. When the jaws are engaged on a pole/tube, the bolt 321 can be pivoted back into the bolt channel 325 and the wingnut 322 can be tightened against the lock surface 330a to tighten the jaws on the pole/tube, as shown in FIGS. 10A-10D.

Figure 11B:
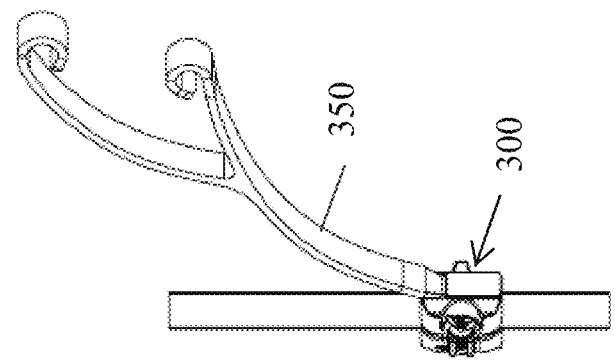
FIGS. 11A-11B are perspective views of an accessory mounted to the clamp of FIGS. 9A-9C.
Figure 11A:
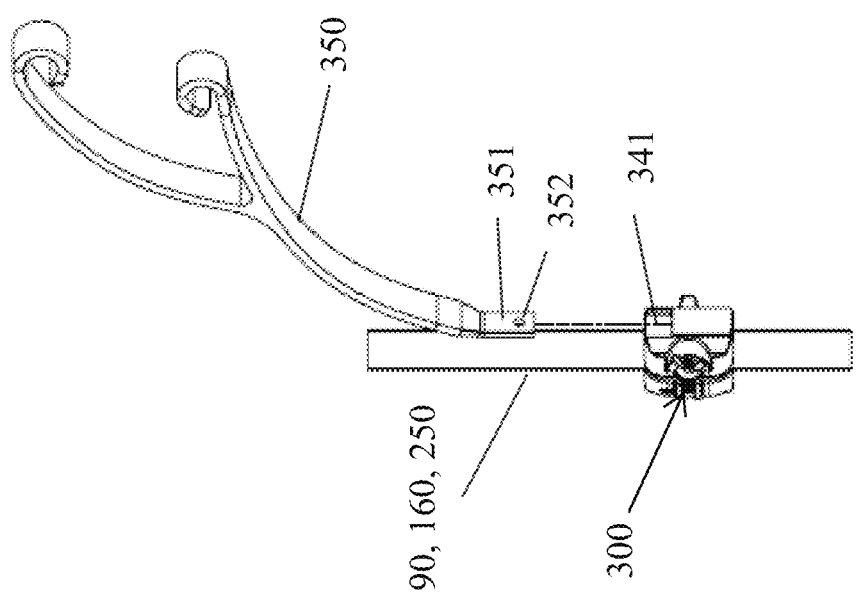

One important feature of the clamp 300 is the ability to receive and support an accessory, such as the accessory 350 shown in FIGS. 11A-11D. Each clamp jaw 301, 302 defines a corresponding recess 340, 341 with the recesses provided on opposite sides of the clamp, as shown in FIG. 9B. The recesses are closed with a corresponding cap 342, 343 which can be permanently or removably fixed to the corresponding jaw. For a removable cap, a tongue and groove interface can be provided between the side walls of the cap 342, 343 and the lateral walls of the recess 340, 341. The recess and cap are configured to receive a tongue 351 at the base of the accessory 350, as shown in FIG. 11A. The tongue 351 can include an outward facing dimple 352 that forms a press-fit between the tongue and the cap 342, 343 to fix and stabilize the accessory within the recess 340, 341. It can be appreciated that the accessory 350 can be of various types, such as to support a hanging bird feeder. It can also be appreciated that any number of accessories can be mounted to any given pole assembly, with the clamps being rotated 90° relative to an adjacent clamp along the height of the pole assembly.

Figure 12A:
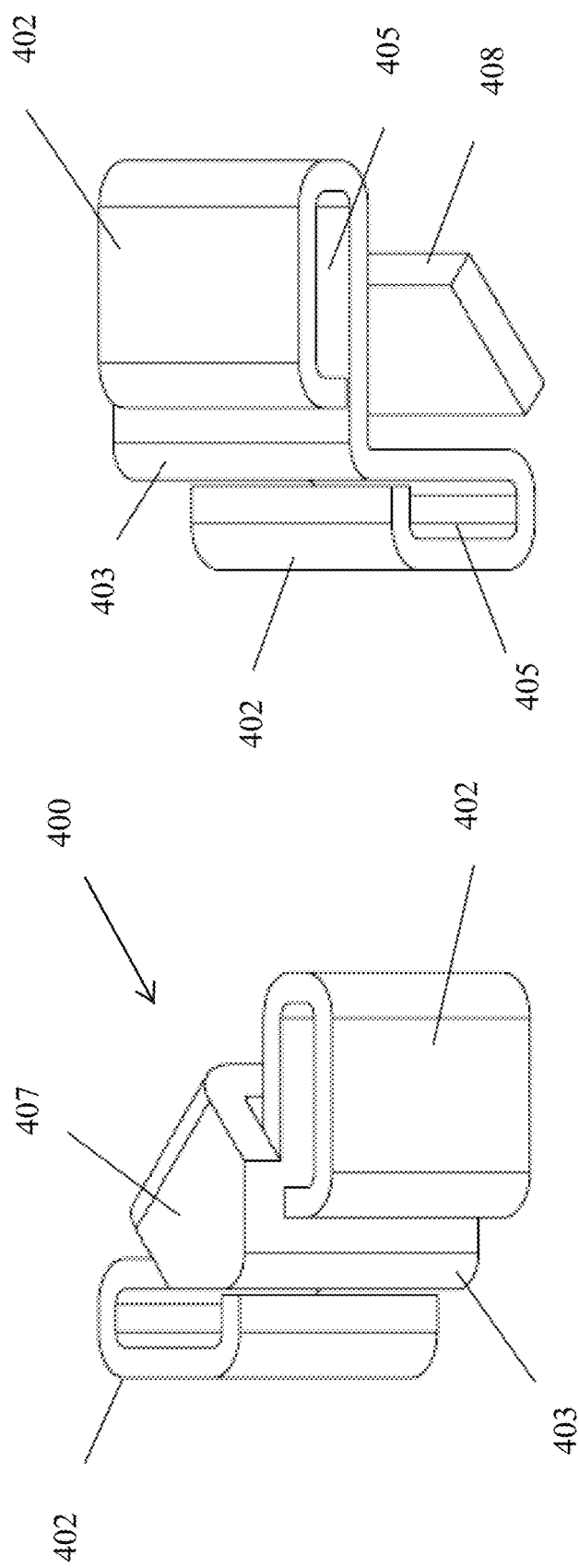
FIGS. 12A-12C are perspective and top views of a doubler for use with the clamp of FIGS. 9A-9C.
Figure 12B:
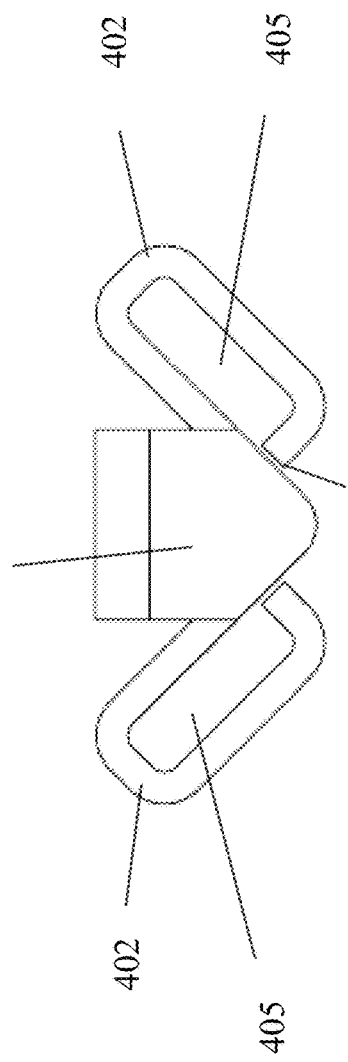
Figure 12C:

The accessory handling ability of the clamp 350 can be enhanced by the doubler 400 shown in FIGS. 12A-143B. The doubler 400 includes a pair of sleeves 402 connected at a bend 403. The sleeves define an open channel 405 that is sized to receive the tongue 351 of the accessory 350 (FIG. 11A). In one embodiment, the sleeves can be open at the bend 403, forming a slot 406. The slot 406 allows some deflection of the sleeve as the tongue is inserted into the channel 405. Thus, the channel can be slightly narrower than the thickness of the tongue so that the sleeve exerts a spring force to help clamp the tongue to the doubler 400. In this embodiment, the sleeves and bend can be formed from a single strip of material that is bent to form the sleeves 402 and bend 403. Alternatively, the sleeves and bend can be formed with the rest of the structure of the doubler 400 in a molding process.

Figure 14B:
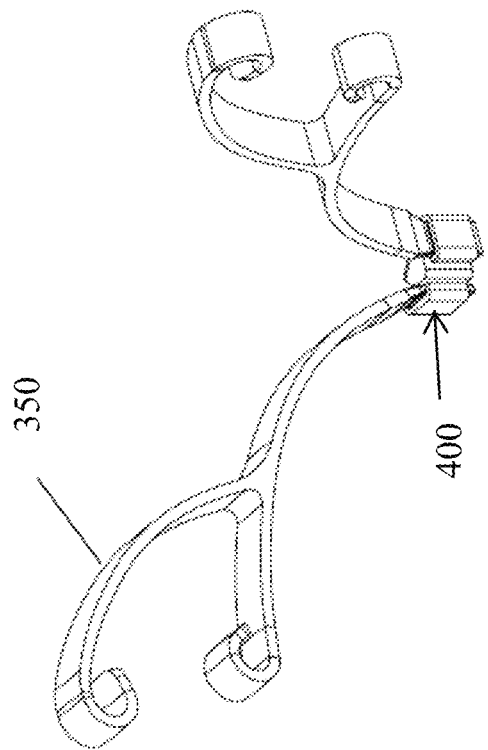
FIGS. 14A-14B are perspective views of an accessory mounted on a doubler of FIGS. 12A-12C.
Figure 14A:
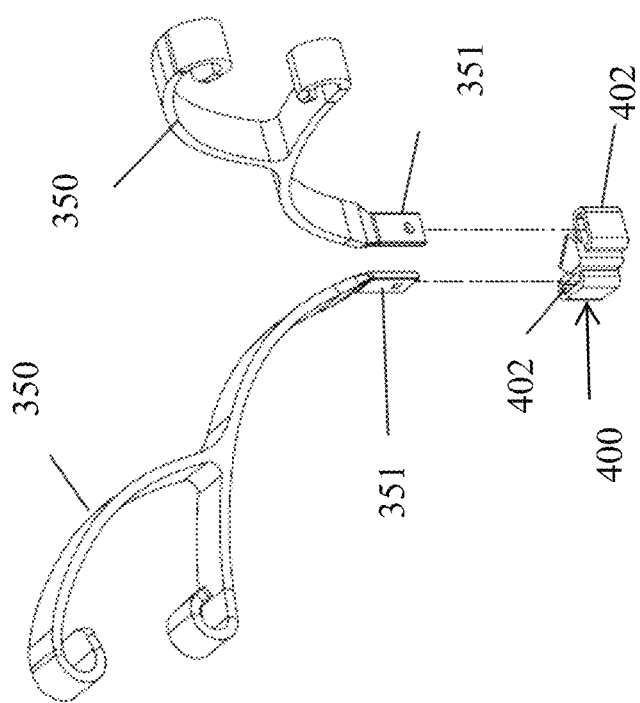

The doubler 400 includes a top plate 407 that is attached to or integral with the bend 403. The top plate 407 is bent to form a mounting plate 408 that is similar to the tongue 351 of the accessory 350. The mounting plate 408 is configured to be received within the recess 340, 341 of one of the jaws 301, 302 of the clamp 300, as shown in FIG. 13A. The doubler is configured to be seated in the recess, with the two sleeves 402 extending outward from the pole/tube 90, 160, 250. As shown in FIGS. 14A-14B, the tongue 351 of two accessories 350 can be inserted into a respective sleeve 402 of the doubler 400. The doubler thus doubles the number of accessories that can be supported by any given recess 340, 341 of the clamp 300. Thus, any given clamp can support up to four accessories, rather than up to two with the clamp alone.

The present disclosure should be considered as illustrative and not restrictive in character. It is understood that only certain embodiments have been presented and that all changes, modifications and further applications that come within the spirit of the disclosure are desired to be protected.

What is claimed is:

1. A pole system for supporting birding accessories, such as bird feeders, perches or bird houses, the pole system comprising:
    an elongated hollow outer tube, said tube including;
        a disk attached at a bottom end, said disk having a bottom surface configured to engage the ground; and
        swaged upper end;
    an elongated post having an auger at one end configured to be driven into the ground and an opposite end configured to engage a tool for rotating the post, said elongated post sized to be received through the outer tube and having a length greater than the length of said elongated outer tube so that said opposite end of said post can be engaged outside said tube when said auger is driven into the ground, wherein said opposite end defines a non-circular cross-section; and
    an elongated hollow extension tube having an open first end configured to be engaged on said swaged upper end to extend the height of the pole system, said extension tube defining a cross-bore passing transversely through said extension tube, said cross-bore sized and configured to engage said opposite end of said elongated post so that said extension tube can be used as the tool for rotating said elongated post to drive said auger into the ground.

2. The pole system of claim 1, wherein said cross-bore is positioned in the middle of the length of said extension tube.

3. The pole system of claim 1, wherein said cross-bore is positioned adjacent one end of said extension tube.

4. The pole system of claim 1, wherein said extension tube includes a second cross-bore passing transversely through said extension tube.

5. The pole system of claim 1, wherein said extension tube has a swaged upper end opposite said open first end.

6. A pole system for supporting birding accessories, such as bird feeders, perches or bird houses, the pole system comprising:
    an elongated hollow outer tube having an outer surface with a non-circular cross-section, said outer tube including a disk attached at a bottom end, said disk having a bottom surface configured to engage the ground;
    an elongated post having an auger at one end configured to be driven into the ground, said elongated post sized to be received through the outer tube and having a length greater than the length of said elongated outer tube so that the opposite end of said post can be engaged outside said tube when said auger is driven into the ground;
    an engagement between said outer tube and said elongated post so that said disk engages the ground when said auger is driven into the ground;
    a clamp configured to releasably engage the outer surface of said outer tube, said clamp including;
    opposite jaws pivotably connected to each other by an axle extending through colinear bushings included on one side of each of said opposite jaws, said opposite jaws each including a pair of inner surfaces configured to form a non-circular cross-section when the jaws are closed to engage said outer surface of said outer tube;
    a locking mechanism between said opposite jaws on an opposite side of said jaws opposite said one side, said locking mechanism configured to lock said opposite jaws together when the jaws are closed about said outer tube; and
    at least one jaw of said opposite jaws including an elongated recess along a side of the at least one jaw between said one side and said opposite side thereof; and
    an accessory including an elongated tongue sized and configured for removable slidable engagement within said elongated recess.

7. The pole system of claim 6, wherein:
    one of said opposite jaws defines a bolt channel on said opposite side thereof, said bolt channel opening at a slot facing the other of said opposite jaws when the opposite jaws are closed on said outer tube;
    the other of said opposite jaws defines a wingnut channel on said opposite side thereof, said wingnut channel opening at a slot facing said one of said opposite jaws when the opposite jaws are closed on said outer tube; and
    said locking mechanism includes;
        a bolt having a head pivotably connected to said one jaw so that said bolt can pivot into and out of said bolt channel and slot, said bolt having a length sufficient to be disposed within said wingnut slot when the bolt is pivoted into said bolt channel; and a wingnut configured to threadedly engage said bolt and configured to be disposed within said wingnut channel when engaged to said bolt, said wingnut including a washer for engaging said wingnut channel at the slot thereof.

8. The pole system of claim 6, wherein each of said opposite jaws includes a lever at said one side of each jaw, wherein the lever of each jaw can be manually pinched together to pivot said opposite jaws apart relative to each other.

9. The pole system of claim 6, wherein:

said at least one jaw includes a cap mounted within said elongated recess to close said recess; and said tongue of said accessory includes a dimple for forming a press-fit engagement with said cap.

10. The pole system of claim 6, wherein the other of said pair of jaws includes an elongated recess along a side of the other jaw between said one side and said opposite side thereof.

11. A pole system for supporting birding accessories, such as bird feeders, perches or bird houses, the pole system comprising:

an elongated hollow outer tube having an outer surface and a disk attached at a bottom end, said disk having a bottom surface configured to engage the ground;

an elongated post having an auger at one end configured to be driven into the ground, said elongated post sized to be received through the outer tube and having a length greater than the length of said elongated outer tube so that the opposite end of said post can be engaged outside said tube when said auger is driven into the ground;

an engagement between said outer tube and said elongated post so that said disk engages the ground when said auger is driven into the ground;

a clamp configured to releasably engage the outer surface of said outer tube, said clamp including opposite jaws pivotably connected to each other and configured to releasably engage an outer surface of said outer tube, at least one of said opposite jaws including a mounting feature for mating with and supporting an accessory on said pole system;

at least one accessory, said accessory including an elongated tongue sized and configured for removable engagement within said mounting feature of said clamp; and a doubler including;

a pair of sleeves, each sized and configured to removably receive said elongated tongue of said at least one accessory; and a mounting plate connected to and supporting said pair of sleeves, said mounting plate sized and configured for removable engagement within said mounting feature of said clamp.

\* \* \* \* \*